(12) United States Patent
Noguchi et al.

(10) Patent No.: US 6,785,122 B2
(45) Date of Patent: Aug. 31, 2004

(54) METHOD FOR PREPARING ELECTROLYTIC SOLUTION, ELECTROLYTIC SOLUTION AND ELECTRIC DOUBLE-LAYER CAPACITOR

(75) Inventors: Minoru Noguchi, Saitama (JP); Shigeki Oyama, Saitama (JP); Takeshi Fujino, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/370,513

(22) Filed: Feb. 24, 2003

(65) Prior Publication Data

US 2003/0169557 A1 Sep. 11, 2003

(30) Foreign Application Priority Data

Mar. 6, 2002 (JP) ........................................ 2002-059703

(51) Int. Cl.[7] ............................ H01G 9/00; H01G 9/038
(52) U.S. Cl. ...................... 361/502; 29/25.03; 361/503
(58) Field of Search ................................ 361/502, 503, 361/504, 511, 512; 29/25.03

(56) References Cited

FOREIGN PATENT DOCUMENTS

| JP | 01-204361 | 8/1989 |
|----|-----------|--------|
| JP | 4-24831 | 1/1992 |
| JP | 04-188559 | 7/1992 |
| JP | 05-094838 | 4/1993 |
| JP | 5-17669 | 9/1993 |
| JP | 05-258996 | 10/1993 |
| JP | 06-123060 | 5/1994 |
| JP | 06-243867 | 9/1994 |
| JP | 09-275042 | 10/1997 |
| JP | 2001-126962 | 5/2001 |

*Primary Examiner*—Anthony Dinkins
(74) *Attorney, Agent, or Firm*—Arent Fox PLLC

(57) ABSTRACT

A method for preparing the electrolytic solution of an electric double-layer capacitor is provided, which undergoes cyclical charging and discharging within a predetermined operating range of voltage. The capacitor includes the electrolytic solution, electrodes and a casing for housing the electrolytic solution and electrodes. The method includes the step of preparing an ion concentration of the electrolytic solution so that the electrolytic solution turns to a nonconductor at a first predetermined voltage, which is so set as to be equal to or greater than the upper limit of the predetermined operating range of voltage and less than or equal to the maximum allowable voltage of the capacitor.

12 Claims, 5 Drawing Sheets

METHOD FOR PREPARING ELECTROLYTIC SOLUTION, ELECTROLYTIC SOLUTION AND ELECTRIC DOUBLE-LAYER CAPACITOR

FIELD OF THE INVENTION

The present invention relates to a method for preparing an electrolytic solution, an electrolytic solution and an electric double-layer capacitor. It relates particularly to a method for preparing an electrolytic solution capable of preventing overcharge of an electric double-layer capacitor, an electrolytic solution and an electric double-layer capacitor.

BACKGROUND OF THE INVENTION

Electric double-layer capacitors, which have high capacitance of farad class, excellent characteristics of charge/discharge cycle and the capability of undergoing rapid charge, have been used for a backup power supply of electronic component, an onboard battery for vehicle (an energy buffer) and the like.

An electric double-layer capacitor will be briefly described referring to FIG. 1.

FIG. 1 is a sectional view showing the main structure of an electric double-layer capacitor.

As shown in FIG. 1, an electric double-layer capacitor 101 includes a casing 102 housing a pair of carbon electrodes (polarizing electrodes) 104 which interposes a separator 103, and a pair of collectors (elements) 105. And the casing 102 is filled with an ion conductive electrolytic solution. The electric double-layer capacitor 101 employs electric charges (shown by + and − in FIG. 1) as dielectrics in a normal capacitor, which are generated at an interface between the solid carbon electrodes 104 and the liquid electrolytic solution and spaced at a distance of molecule.

Electrolytic solutions used for electric double-layer capacitors are roughly categorized into an aqueous electrolytic solution made of dilute sulfuric acid added with an electrolyte and an organic electrolytic solution made of an organic solvent added with an electrolyte. An appropriate type of electrolytic solution is selectably applied to an electric double-layer capacitor taking into account the usage thereof. An electric double-layer capacitor using an aqueous electrolytic solution is advantageous in terms of lower internal resistance and higher power density, which also enables flexibility for setting of voltage requirements. On the other hand, an organic electrolytic solution, which allows a higher withstand voltage per cell, is advantageous in terms of energy density. It also allows selection of inexpensive and light metals such as an aluminum alloy for a casing.

An activated carbon or activated carbon fiber with a large specific surface area is generally used for an electrode of electric double-layer capacitor so that the capacitor can attain high electrostatic capacitance. Since the more the specific surface area of an activated carbon increases, the more the number of pores therein will increase, the amount of adsorption of electrolytic ions grows, thereby resulting in higher electrostatic capacitance. Generally speaking, an activated carbon having a specific surface area of some thousands square meters per gram ($m^2/g$) is used for an electrode. It is reported that application of an activated carbon with a large specific surface area can provide an electric double-layer capacitor with high capacitance such as some hundreds to some thousands farads (F).

Volume and specific surface area per weight for an activated carbon are substantially linearly proportional each other. However, volume per electrode reaches maximum when the specific surface area of an activated carbon falls into the range of 2000 to 2500 $m^2/g$, and decreases if the area exceeds the range, which is reported in the document (DENKI KAGAKU, 59, P.607). The reason for it is that the density of an electrode seemingly decreases due to an increase in volume of pores according as a specific surface area increases. Improvement of the specific surface area of an activated carbon is believed to relate closely to higher electrostatic capacitance. However, as the bulk density of an activated carbon decreases with the increase of pores in connection with improvement of specific surface area, electrostatic capacitance per volume of an electrode will accordingly fall.

In an effort for increasing the electrostatic capacitance per volume of an electrode, the development of an electrode using a graphitized carbon has been started.

Especially, an activated carbon (mesophase carbon fiber or mesophase microsphere), which is made of alkali activated mesophase pitch, has been recently used for a polarizing electrode of electric double-layer capacitor.

Mesophase carbon fiber is a kind of carbon fiber which is produced from pitch and the like as an ingredient (graphitized carbon). Pitch is optically isotropic, but when it is heated, pitch molecules start regular orientation, thereby a portion of optical anisotropy (optically anisotropic microsphere) is generated. Eventually, the portion is transformed into coke completely, which is optically anisotropic and shows a flow pattern. Such a portion of optical anisotropy is called mesophase. Mesophase carbon fiber is a type of carbon fiber produced from pitch, which is transformed into mesophase to some extent, by spinning such as meltblow method.

Mesophase carbon fiber has optical anisotropy and relatively high degree of orientation. The basic orientation is immune to oxidization (infusible treatment) by air, and what is more it is remarkably improved by carbonization and high temperature treatments. Also mesophase carbon fiber has high graphitization. In this way mesophase carbon fiber can be applied to a polarizing electrode having high electrostatic capacitance per volume.

Japanese Patent Application Publication 05-258996 discloses an electrode employing mesophase carbon made of carbonaceous fiber, which is activated by an aqueous solution of alkaline metal hydroxide and crushed. The carbonaceous fiber is produced from pitch with melt spinning and subsequent heat treatment. Also Japanese Patent Application Publication 09-275042 discloses a polarizing electrode with high electrostatic capacitance using an activated carbon, which is produced from vinyl chloride resin with baking and subsequent alkali activation.

An electric double-layer capacitor arranged as described above is adaptive for rapid charge when the capacitor is operated under cyclic charge and discharge. Generally, the capacitor is operated while electrically connected to a charge and discharge control circuit or to an overcharge protection circuit in order to prevent overcharging. When the voltage of an electric double-layer capacitor exceeds a predetermined value, namely a predetermined charge control voltage, the circuit cuts off power supply to the capacitor.

However, when there is not provided a circuit of this type or the function of overcharge protection of the circuit does not work properly, the performance of charge and discharge of the electric double-layer capacitor may deteriorate, which is overcharged with a higher voltage than the predetermined value.

Furthermore as described before, when electrostatic capacitance per volume is increased, the volume of an electrode generally tends to expand. It accordingly requires a reduction in filling factor of electrode. If the filling factor is thus set smaller, which leads to a reduction in energy density, an electric double-layer capacitor cannot fully demonstrate its features. Typically, this holds true of an electric double-layer capacitor which employs a material with high electrostatic capacitance for an electrode, such as an activated carbon produced from mesophase pitch with alkali activation.

Instead of reducing the filling factor, it may be possible to increase the thickness of casing for an electric double-layer capacitor so that the casing can withstand the load generated by expansion of the electrode.

However, the increase in casing thickness results in an undesirable increase in the gross weight of the capacitor.

SUMMARY OF THE INVENTION

An object of the present invention is to provide a method for preparing an electrolytic solution and the electrolytic solution which can prevent overcharging of an electric double-layer capacitor.

The other object of the present invention is to provide an electric double-layer capacitor using the electrolytic solution which facilitates protection against an overcharge for the capacitor.

The inventors of the present invention have made strenuous efforts towards achieving an electrolytic solution which is able to prevent overcharging of an electric double-layer capacitor. As a result of study, it has been discovered that overcharging can be prevented by preparing an electrolytic solution so that the solution turns to a nonconductor at a predetermined voltage. The voltage is determined so as to be equal to or greater than the upper limit of operating range of voltage and less than or equal to maximum allowable voltage of the electrolytic solution.

An object of the present invention is to provide a method for preparing an electrolytic solution of an electric double-layer capacitor which undergoes cyclical charging and discharging within a predetermined operating range of voltage. The capacitor includes the electrolytic solution, electrodes and a casing for housing the electrolytic solution and electrodes. The method has the step of preparing an ion concentration of the electrolytic solution so that the solution turns to a nonconductor at a first predetermined voltage, which is so set as to be equal to or grater than an upper limit of the predetermined operating range of voltage and less than or equal to a maximum allowable voltage of the capacitor.

As the electrolytic solution is prepared as described above, when the electric double-layer capacitor is overcharged at a voltage higher than the operating range of voltage, no ions exist in the electrolytic solution at the first predetermined voltage, which is less than or equal to the maximum allowable voltage. The electrolytic solution thus turns to a nonconductor so that charging of the capacitor is stopped. Therefore, the capacitor will not be charged if the voltage of electrolytic solution exceeds the first predetermined voltage.

In the present invention, the term "a predetermined operating range of voltage" used in the appended claims refers to a voltage range, under which a capacitor is normally used. "A maximum allowable voltage" means the maximum voltage of a capacitor, which is defined taking into account the characteristics of a polarizing electrode, casing and the like. The maximum allowable voltage may be set flexibly taking into account practical reasons such as the operating range of voltage for a capacitor, the external voltage imposed on the capacitor during charging and protection against a liquid leak.

Also the expression in the present invention "the ion concentration at which an electrolytic solution turns to a nonconductor" means that the ion concentration is substantially close to zero in the electrolytic solution at the first predetermined voltage. In other words, it refers to an ion concentration at which the electric resistance of electrolytic solution is substantially large (is close to infinite).

Another object of the present invention is to provide a method for preparing an electrolytic solution of an electric double-layer capacitor, wherein the capacitor is employed while electrically connected to a charge and discharge control circuit having a second predetermined voltage thereof, and the first predetermined voltage is so set as to be equal to or greater than the second predetermined voltage and less than or equal to the maximum allowable voltage.

When the electric double-layer capacitor according to the present invention is used while connected to such a control circuit as the charge and discharge control circuit, the protection against overcharging can be implemented by both the first predetermined voltage of electrolytic solution and the second predetermined voltage of control circuit. In case failure occurs in the circuit, the failsafe arrangement can securely prevent overcharging of the capacitor.

Still another object of the present invention is to provide a method for preparing an electrolytic solution for an electric double-layer capacitor, wherein the ion concentration is set based on a function of charge voltage vs. coefficient of expansion of an electrode or the other function of charge voltage vs. generated load thereof.

When the ion concentration of electrolytic solution is set based on a curve representing the relation of charge voltage vs. coefficient of expansion of electrode, the filling factor of electrode can be determined taking into account the coefficient of expansion of electrode, thereby resulting in a increase in energy density of the electrode. On the other hand, when the ion concentration is set based on a curve representing the relation of charge voltage vs. generated load, the casing can be optimized. This leads to a reduction in the gross weight of the electric double-layer capacitor as a result of a reduction in the thickness of casing when one particular material is under consideration. Also this achieves a more compact electric double-layer capacitor by thinning the thickness of casing.

The term in the present invention "coefficient of expansion of an electrode" is defined as the rate of increase in thickness of electrode while charged under a constant load. The term "generated load" refers to a load generated while the electrode is charged, kept its thickness constant.

Yet another object of the present invention is to provide a method for preparing an electrolytic solution of an electric double-layer capacitor, wherein the electrodes are made of activated carbon which is produced from a graphitized carbon with carbonization and subsequent alkali activation.

Activated carbon produced from mesophase pitch with alkali activation has high electrostatic capacitance. When the activated carbon is used for a polarizing electrode, it is possible to provide an electric double-layer capacitor of high electrostatic capacitance with compact size. The method for preparing electrolytic solution according to the present invention can be applied to an electric double-layer capacitor, which employs activated carbon that is produced from a graphitized carbon such as mesophase carbon with carbonization and subsequent, alkali activation. Since the maximum values of coefficient of expansion and generated load for the activated carbon can be controlled, it is possible to relax the requirements for strength of casing and the like.

A further object of the present invention is to provide an electrolytic solution for an electric double-layer capacitor, to which the method for preparing an electrolytic solution is applied.

The electrolytic solution for electric double-layer capacitor according to the present invention turns to a nonconductor at a predetermined voltage, which cuts off charging of the capacitor, thereby preventing the capacitor from being charged when the voltage of electrolytic solution exceeds the predetermined voltage.

A still further object of the present invention is to provide an electric double-layer capacitor which undergoes cyclical charging and discharging within a predetermined operating range of voltage. The capacitor includes an electrolytic solution, electrodes and a casing for housing the electrolytic solution and electrodes. The capacitor has a feature that the electrolytic solution is prepared according to the method described before.

When the electric double-layer capacitor is overcharged at a higher voltage than the upper limit of operating range of voltage, ions will cease to exist in the electrolytic solution at a predetermined voltage for the electrolytic solution, which is set less than or equal to a maximum allowable voltage. The electrolytic solution thus turns to a nonconductor, thereby stopping charging of the capacitor. Therefore, charging of the capacitor at a higher voltage than the predetermined voltage can be prevented.

A yet further object of the present invention is to provide an electric double-layer capacitor. The capacitor has a feature that electrodes are made of activated carbon which is produced from graphitized carbon with carbonization and subsequent alkali activation.

According to the present invention it is possible to control the maximum values such as coefficient of expansion and generated load of mesophase carbon. It results in a better balance between the strength of casing and the filling factor of polarizing electrodes, thereby providing an electric double-layer capacitor having larger capacitance. In other words, the present invention makes it feasible to provide an electric double-layer capacitor with advantages of better compactness, lighter weight and larger capacitance.

DESCRIPTION OF THE PREFERRED EMBODIMENTS

An embodiment of the present invention will now be described. It is appreciated that the present invention is not limited to the embodiment to be discussed.

a. Electric Double-Layer Capacitor

An electric double-layer capacitor according to the present invention will be described referring to FIGS. 2 and 3. It is possible to select another appropriate type of capacitor from conventional electric double-layer capacitors depending on purposes. Description will be made typically exemplifying an onboard electric double-layer capacitor with organic electrolyte.

Figure 1:
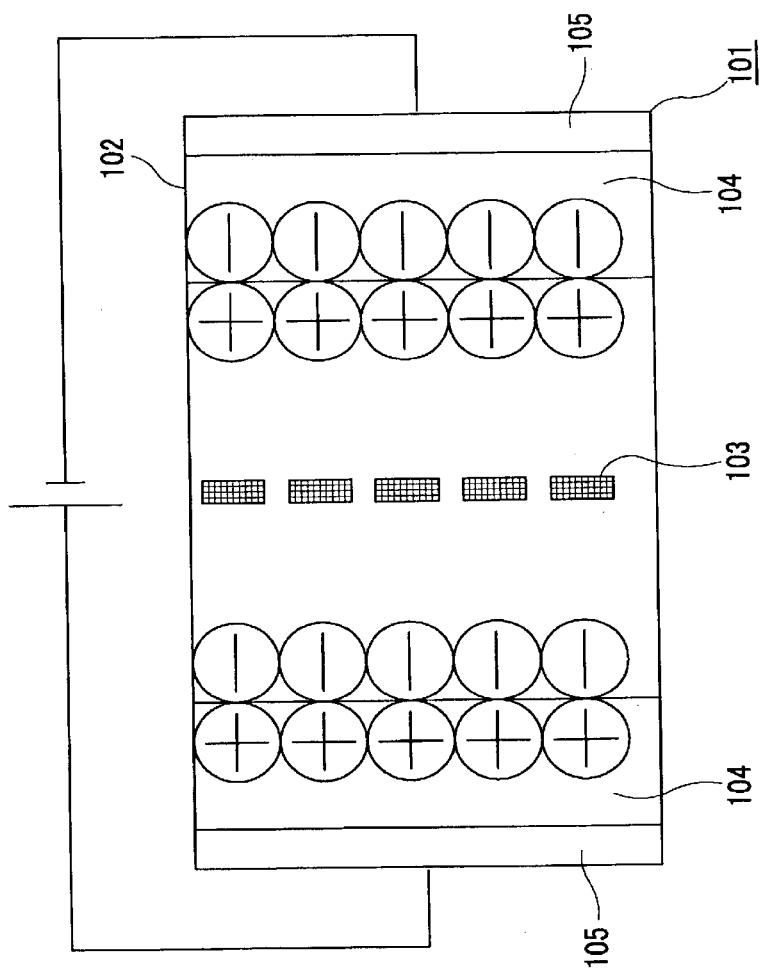
FIG. 1 is a sectional view showing a fundamental structure of electric double-layer capacitor.
Figure 2:
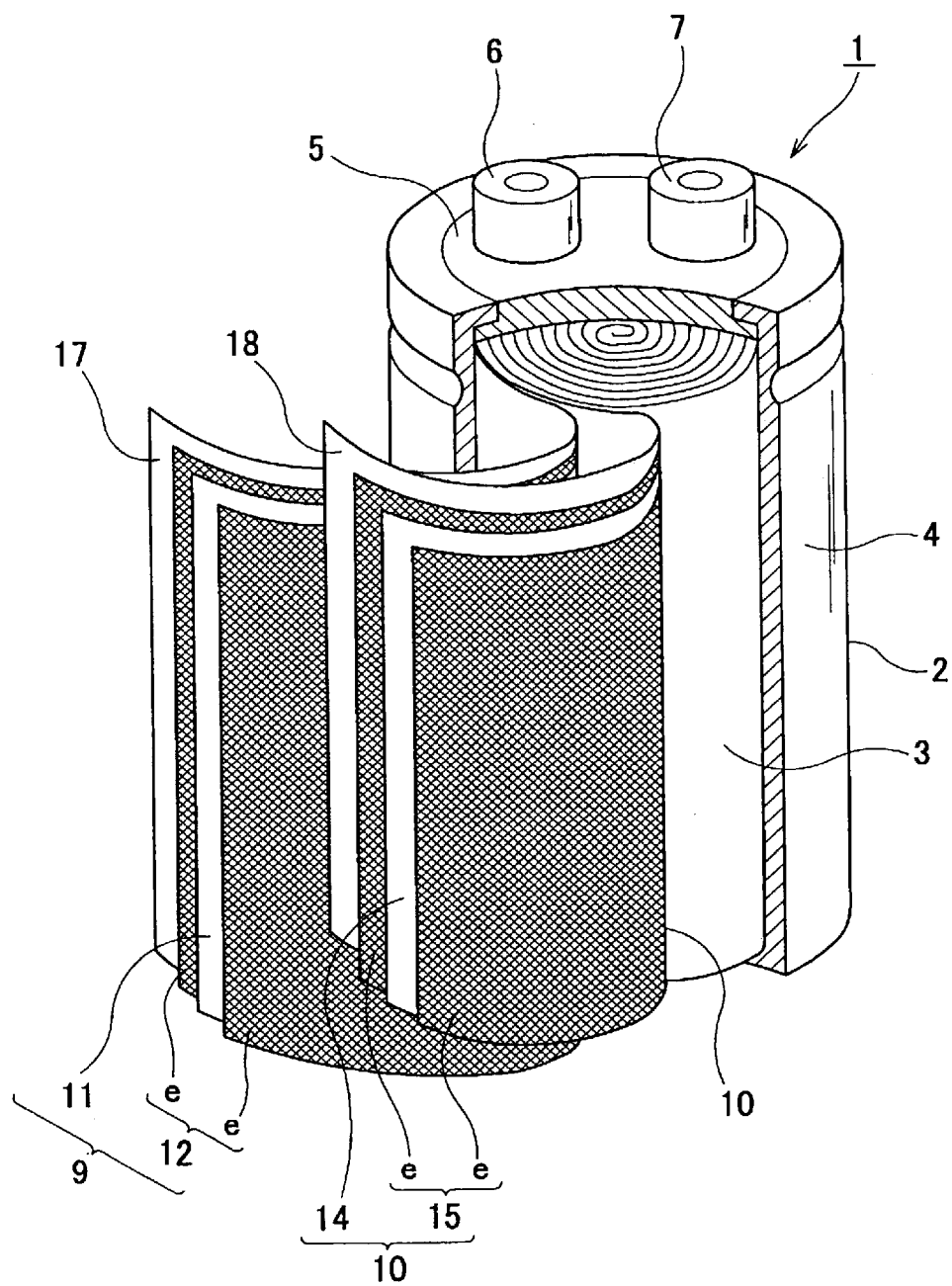
FIG. 2 is a view showing an example of electric double-layer capacitor.

FIG. 2 shows an example of electric double-layer capacitor.

An electric double-layer capacitor 1 shown in FIG. 2 is mainly comprised of a cylindrical casing 2, a rolled electrode 3 separated by separators 17 and 18 and an electrolytic solution filled in the casing 2.

The casing 2 is, for example, made of aluminum alloy taking into account easiness in terms of fabrication and lightness. The casing 2 comprises a cylindrical main body 4 with a base and a terminal plate 5 to close an opening thereof, on which positive and negative terminals 6 and 7 are provided, respectively.

The rolled electrode 3 has a first positive electrode 9 and a second negative electrode 10.

The first positive electrode 9 comprises a film collector 11 made of aluminum foil, on each surface of which a film polarizing electrode e is bonded with an electrically conductive adhesive to form a positive film electrode 12.

The second negative electrode 10 comprises a film collector 14, on each surface of which a film electrode e is bonded with an electrically conductive adhesive forming a negative film electrode 15.

The first positive electrode 9 and second negative electrode 10 are separated by the separators 17 and 18.

In this connection, the separators 17 and 18 may be assembled in such a manner as disclosed in Japan Patent Application Publication 2001-126962. First a piled component is prepared by interposing at least one of the first positive and second negative electrodes 9 and 10, which can be piled up one on top of the other, for example the first positive electrode 9 between the first and second separators 17 and 18. Subsequently, the component is rolled spirally placing the first separator 17 outermost.

The electric double-layer capacitor described above has been used by itself or connected in series depending on purposes.

Material for an electrode used for the electric double-layer capacitor according to the present invention is selected from known materials found in the related technical field such as activated carbon or carbon fiber as the case may be.

An activated carbon having a specific surface area larger than a thousand square meters per gram ($m^2/g$), preferably larger than 1500 $m^2/g$ should be selected. It is more preferable if activated carbon produced from graphitized carbon with carbonization and subsequent alkali activation, mesophase pitch in particular is selected. Activated carbon, which is produced from the graphitized carbonaceous undergoing carbonization with controlled baking temperature and subsequent alkali activation, such as coke, mesocarbon microsphere, mesophase pitch carbon fiber and pyrolysis vapor phase epitaxy carbon fiber, has high electrostatic capacitance. The related techniques have been recently disclosed in documents. In addition to the publication described before, they are found following documents, the contents of which are hereby incorporated by reference: Japan Patent Publications 05-017669 and 04-024831, Japan Patent No. 2621294, Japan Patent Application Publications 04-188559 (mesophase microshere), 06-243867 (onion-like structure) and 05-094838 (diploid carbon fiber). In the present invention, such materials that can contribute to higher electrostatic capacitance can be used for an electrode. In this connection, an electrode comprising both nongraphitized carbon fiber such as polyacrylonitrile fiber, vinyliden chloride fiber, cellulose fiber or phenolic fiber and graphitized carbon fiber such as petroleum coke or coal pitch, disclosed in Japan Patent Application Publication 06-123050, can be employed in the present invention.

More specifically, graphitized carbon such as pitch series, acrylonitrile series, and activated carbon obtained from vinyl chloride material with carbonization and subsequent alkali activation, especially activated carbon produced from mesophase pitch with alkali activation shown in Japan Patent Application Publication 09-275042 has high electrostatic capacitance but tends to expand when it is used for an electrode compared with activated carbon of normal type. And mesophase pitch has high orientation so that uniform reaction of activation tends to occur and forms uniform pores. Activated carbon obtained from mesophase pitch with alkali activation has pores with an optimum diameter, which depends on the diameter of an electrolytic ion, and also has uniform distribution thereof. An electric double-layer capacitor using such type of activated carbon for an electrode has higher electrostatic capacitance, especially electrostatic capacitance per volume, than that of others which employ generally used activated carbon.

An electrolytic solution applicable to an electric double-layer capacitor can also be selected from electrolytic solutions which have been used conventionally.

Though it is not limited to those, electrolytic solutions can be named such as perchloric acid, hexafluoro phosphoric acid, tetrafluoro boric acid, tetraalkyl ammonium salt or amine salt of trifluoro alkyl sulfonic acid and tetraalkyl ammonium salt or amine salt of tetrafluoro alkyl sulfonic acid.

These electrolytes are solved into a polarizing solvent such as propylene carbonate, gamma butyl lactone, acetonitrile, dimethylhormamide, 1, 2-dimethoxy ethane, Sulfolan and nitro ethane, serving as an electrolytic solution.

An electric double-layer capacitor comprising electrodes and an electrolytic solution, which is in operation under cyclic charging and discharging, is electrically connected to an overcharge protection circuit or charge and discharge control circuit in order to prevent overcharging.

The charge and discharge control circuit of an electric double-layer capacitor will be described referring to FIG. 3. FIG. 3 is a circuit diagram showing an exemplary charge and discharge control circuit. A plurality of electric double-layer capacitors 1, for example, supplies electricity to a drive system shown in FIG. 3. In this system, the capacitors 1 with a motor generator MG are mounted on a hybrid vehicle having assist and regenerative modes as an energy buffer.

The electric double-layer capacitors 1 of this drive system drive the motor generator MG through an inverter INV for assist mode, but on the other hand charge electricity generated by the motor generator MG through the inverter INV for regenerative mode. In short, the capacitors 1 discharge in assist mode and are charged in regenerative mode.

This drive system also has a voltage sensor V for detecting the terminal voltage across the plurality of electric double-layer capacitors 1 and a current sensor A for detecting a current running therethrough. When the capacitors 1 are used in an electrically connected arrangement, as the voltage of each capacitor 1 possibly has its own value or in order to detect individual failure, a plurality of cell voltage sensors CV are prepared so that a terminal voltage for each capacitor 1 can be detected. The outputs of these sensors V, A and CV are sent to a capacitor control unit 20. The unit 20, which calculates charged electricity (SOC) of the capacitors 1 based on the obtained voltage and current, delivers the calculated data to a control CPU 21. The control CPU 21, which generates a control signal based on the data delivered from the unit 20, sends a signal to the inverter INV and controls driving and regeneration of motor generator MG through the inverter INV.

When the voltage detected by the cell voltage sensor CV exceeds the upper limit of operating range of voltage shown in FIG. 5 to be discussed later, which corresponds to "an upper limit of the predetermined operating range of voltage" in the appended claims, the capacitor control unit 20 sends an alarm signal to the control CPU 21. On the other hand, when the control CPU 21 receives this signal, it generates a control signal to command the inverter INV to restrict charging of the whole electric double-layer capacitors 1 and sends the control signal to the inverter INV. In this way the regenerative charging by the motor generator MG is restricted so that the capacitors 1 are operated within the operating range of voltage.

In the electric double-layer capacitor 1 according to the present invention, which is arranged and charged as described above, the ion concentration of electrolyte in the electrolytic solution is adjusted so that the ion concentration falls in a predetermined range for protection against overcharging.

In other words, the concentration of electrolyte in the electrolytic solution is set so that the ion concentration of electrolyte substantially approaches zero when the charge voltage of capacitor 1 reaches a predetermined value.

The method for setting the ion concentration of electrolyte in the electrolytic solution according to the present invention will be described in detail referring to FIGS. 4–6.

Figure 4:
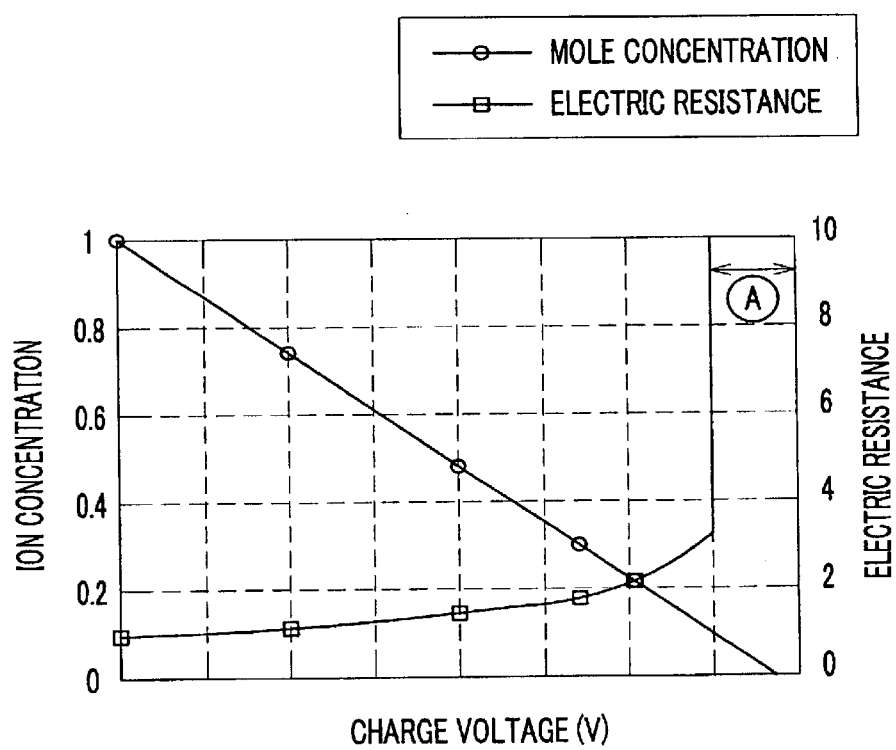
FIG. 4 is a diagram showing a charge volt vs. ion concentration (mole concentration) and a charge volt vs. electric resistance of electrolyte.

FIG. 4 is a diagram showing a charge volt vs. ion concentration (mole concentration) and a charge volt vs. electric resistance of electrolytic solution. FIG. 5 is a diagram showing a charge voltage vs. coefficient of expansion of electrode of electric double-layer capacitor. FIG. 6 is a diagram showing a charge voltage vs. generated load of electric double-layer capacitor.

It should be noted that the term "charge voltage" does not mean a voltage imposed on an electric double-layer capacitor for charging but another voltage possessed by the capacitor.

As shown in FIG. 4, the ion concentration of electrolyte in an electrolytic solution is proportional to a charge voltage. When the charge voltage of electric double-layer capacitor is zero (equivalent to a state of discharge), the ion concentration of electrolyte in an electrolytic solution makes an initial value of one (1).

The electrolyte (ion) in electrolytic solution is gradually adsorbed to electrodes as charging of an electric double-layer capacitor with a voltage imposed thereon progresses. The ion concentration of electrolyte in the electrolytic solution decreases as the charge voltage of capacitor increases, becoming zero (0) when the voltage reaches a predetermined value.

The electric resistance of electrolyte in charging process gradually increases and shows an abrupt upturn at a given charge voltage. As the electric resistance of electrolyte increases in this way, the electrolyte turns to a nonconductor and thereby electricity can no more be supplied to the electrolytic solution. Even if a voltage is imposed on the electric double-layer capacitor, charging of the capacitor cannot be performed any more.

In the area shown with arrow A in FIG. 4 where the ion concentration in electrolytic solution falls in a given range, the electrolytic solution serves as a nonconductor.

In the present invention, the ion concentration of electrolyte in an electrolytic solution is adjusted so that the electrolytic solution turns to a nonconductor at a predetermined charge voltage. The range of voltage in which an electrolytic solution turns to a nonconductor can be determined with a data such as that shown in FIG. 4, which can be obtained by testing conducted in advance with a specific electrolytic solution and electrode to be used.

When the ion concentration of electrolyte in an electrolytic solution is adjusted for a target of charge voltage, it is preferred that the following expression (1) be used.

$$V = 96500 \times M \times Ve/C \tag{1}$$

where M in the right side of expression is the mole of electrolyte in an electrolytic solution, V in the left side is a voltage (V) to be determined, Ve the volume (L) of electrolytic solution and C is the capacitance (F) of a capacitor. In this connection, the constant of 96500 is Coulomb energy which is generated by an electrolytic solution of 1 mole while ionized.

For example, when an activated carbon produced from alkali activated mesophase pitch is used in an electric double-layer capacitor having capacitance of 2000 F shown in FIG. 2, which has 80 ml of an electrolytic solution and 3.86 V of a desired predetermined voltage, the expression (1) produces an M of 1 mole: $M = 2000 \times 3.86/(96500 \times 0.08) = 1$ mole.

b. Setting of Charge Voltage

The present invention, which adjusts the ion concentration of electrolyte in an electrolytic solution based on principles described above, determines a setting voltage depending on the structure of an electric double-layer capacitor, specifically the structure of a polarizing electrode (characteristics of a material selected for an electrode such as coefficient of expansion and generated load) and the durability of a casing (strength of a selected material, mass of a casing).

When a material having large electrostatic capacitance such as an activated carbon obtained from alkali activated mesophase, it may be necessary to take into account the expansion of a polarizing electrode caused by overcharging. Also even if the expansion is not so critical, it may be necessary to pay attention to an increase in the internal pressure of casing caused by electrolysis of an electrolytic solution during overcharging.

A charge voltage controlled by the adjustment of an electrolytic solution is determined based on the relationship between a charge voltage and expansion of an electrode for the former case, and based on the relationship between a charge voltage and generated load for the latter case, respectively. The method according to the present invention for determining a charge voltage controlled by the adjustment of an electrolytic solution will be described referring to FIGS. 5 and 6.

c. First Method

In this method, a charge voltage controlled by the adjustment of an electrolytic solution is determined based on the relationship between a charge voltage and expansion of an electrode.

Figure 5:
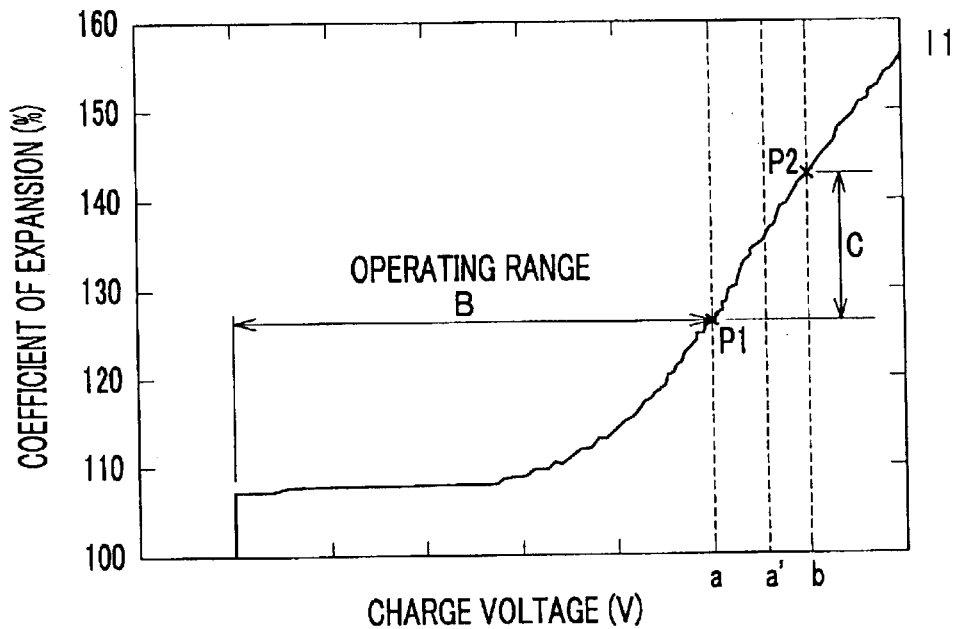
FIG. 5 is a diagram showing a charge voltage of electric double-layer capacitor vs. coefficient of expansion of electrode.

FIG. 5 shows the change of thickness of an electrode in the form of coefficient of expansion while a constant load (1 $kgf/cm^2 = 100000$ $N/m^2$) is exerted on the electrode developed by the inventors, which is made of an activated carbon produced from a vinyl chloride resin with baking and alkali activation.

The electrode expands about 8% (initial expansion) with the injection of electrolytic solution. When the electrode is charged subsequently, it is observed that the electrode expands in proportion to a charge voltage at some voltage (starting voltage of expansion (V) in FIG. 5) or more. The curve representing the expansion is shown by a line 11 in FIG. 5.

For example, it is assumed that the charge and discharge of the electrode is conducted within the range shown with an arrow B and the electrode is used for an electric double-layer capacitor having a maximum allowable voltage of b (V). The ion concentration of electrolyte in an electrolytic solution, in this case, is adjusted so that the solution turns to a nonconductor at a voltage of a (V).

Setting of the ion concentration of electrolytic solution has been described referring to FIG. 4 and the expression (1). If the ion concentration of an electrolytic solution is adjusted so that the solution turns to a nonconductor at the predetermined charge voltage for an electrode a (V), which is equal to the charge voltage for an electric double-layer capacitor, the electrode will not be charged at a (V) or more. This means that the electric double-layer capacitor using this electrode will not be charged at a (V) or more.

Then as a point P1 in FIG. 5 shows, the electrode will not expand more than the coefficient of expansion at P1, which is in this case about 30%.

On the other hand, the filling factor of electrode has been conventionally determined based on the coefficient of expansion at the charge voltage of a' (V) in FIG. 5, to be on the safe side taking into account overcharging.

When the electrolytic solution prepared by the method according to the present invention is applied to an electric double-layer capacitor, the filling factor of electrode can be determined based on the coefficient of expansion at the voltage of a (V).

It is known that the energy density of an electric double-layer capacitor will drop if the filling factor of electrode is decreased. Compared with the prior art, the present invention therefore allows a higher filling factor as much as the amount shown with an arrow C, which defines a difference in coefficient of expansion between the points P1 and P2.

Application of the electrolytic solution according to the present invention thus enables filling of electrodes in a high density, thereby utilizing the characteristics of material forming an electrode to its best advantage. Especially when a material which has high electrostatic capacitance and tends to expand while being charged, such as an activated carbon produced from mesophase pitch with alkali activation, is used for an electrode, the advantage described above is remarkably well demonstrated.

In order to improve a filling factor, an approach of employing a sturdier casing of electric double-layer capacitor may be considered as an alternative. For example, a thicker casing is an alternative to improve the strength of casing. However, if this type of approach to improve the strength is adopted, it will sacrifice the weight. If the thickness of casing is increased under a fixed overall volume, the inner volume available for an electric double-layer capacitor will decrease, accordingly resulting in a decrease in the volume available for electrodes. On the other hand, use of an electrolytic solution according to the present invention improves the volume available for filling of electrode for an electric double-layer capacitor under a fixed volume.

d. Second Method

In the present invention, the other method, which takes into account generated load, allows setting of a charge voltage in combination with the first method or independent of it.

Figure 6:
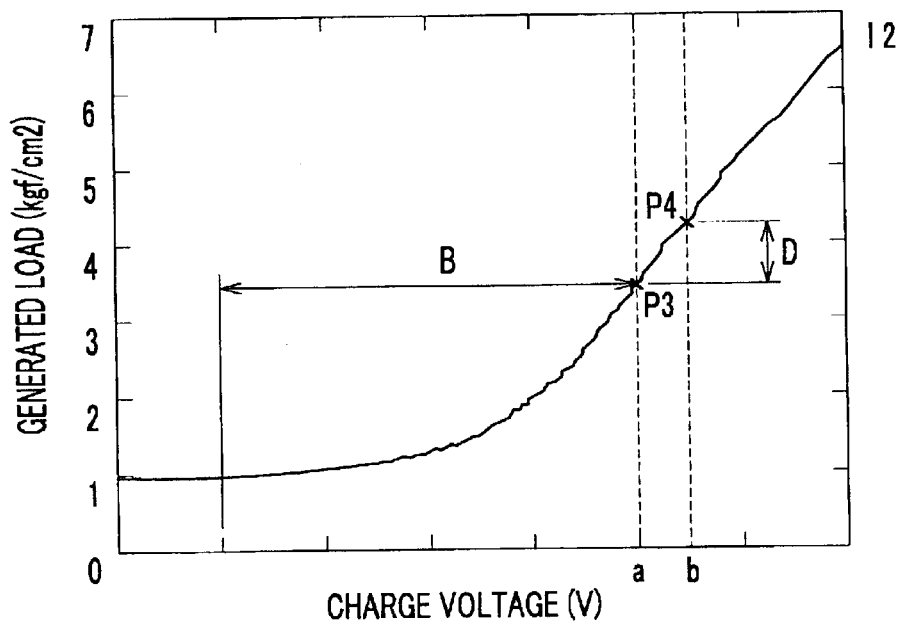
FIG. 6 is a diagram showing a charge voltage vs. generated load of electric double-layer capacitor.

FIG. 6 is a diagram showing the results of a charge voltage vs. load generated in the same electrode as that of FIG. 5 under the fixed thickness of electrode. The generated load at the charge voltage of 0 V is a load imposed on an electrode when an electrolytic solution is supplied.

As shown in FIG. 6, a generated load shown by a curve 12 with regard to a charge voltage increases as the charge voltage rises, same as the curve 11 relating a charge voltage and coefficient of expansion of an electrode.

In an example (the second method) shown in FIG. 6, it is assumed that an electrode, for which charge and discharge is performed in a range of voltage (operating range of voltage) shown with an arrow B and b (V) is defined as a maximum allowable voltage, is used for an electric double-layer capacitor, in the similar manner as that of the first method shown in FIG. 5. The ion concentration of an electric double-layer capacitor is adjusted so that the electrolytic solution turns to a nonconductor at a voltage of a (V) shown in FIG. 6, same as the method 1.

The method for adjusting the ion concentration described before referring to FIG. 4 and the expression (1) is applicable to the second method, too. If the ion concentration of an electrolytic solution is adjusted so that the electrolytic solution turns to be a nonconductor at the charge voltage of a (V) for an electrode, the electrode will not be charged at a (V) or more.

As shown in FIG. 6, the generated load of electrode does not exceed the value at a point P3 (in this case about 3.2 kgf/cm$^2$).

On the other hand, the maximum estimated load (in this case about 4.2 kgf/cm$^2$ at a point P4) of an electrode has been conventionally considered based on the generated load at the voltage of b (V) in FIG. 6.

Generally speaking, a casing is designed to withstand 1.5 times as high as an estimated load. According to the present invention, the requirement for strength of a casing can be relaxed a couple of times, for example 1.5 times as much as a difference (shown with an arrow D in FIG. 6) in the generated load between the charge voltages a (V) and b (V). In this example it results in: $(4.2-3.2) \times 1.5$ kgf/cm$^2$=1.5 kgf/cm$^2$ (150000 N/m$^2$).

In this way, it is possible to select a thinner design for a material used for a casing, for example aluminum alloy. It will be followed by a reduction in the gross weight of an electric double-layer capacitor, which leads to a remarkable advantage when a plurality of electric double-layer capacitors are installed electrically connected. It is also advantageous to improve volume efficiency of an electric double-layer capacitor.

When an electric double-layer capacitor according to the prior art happens to be overcharged, failure such as a leak of electrolytic solution may occur if a generated load exceeds the strength of a casing. On the other hand, since a load will not exceed that generated at a predetermined voltage of a (V), the present invention can prevent failure such as a leak of electrolytic solution.

e. Combination with a Charge and Discharge Control Circuit

The advantages of the present invention thus hold true in controlling the charge voltage of an electric double-layer capacitor.

Figure 3:
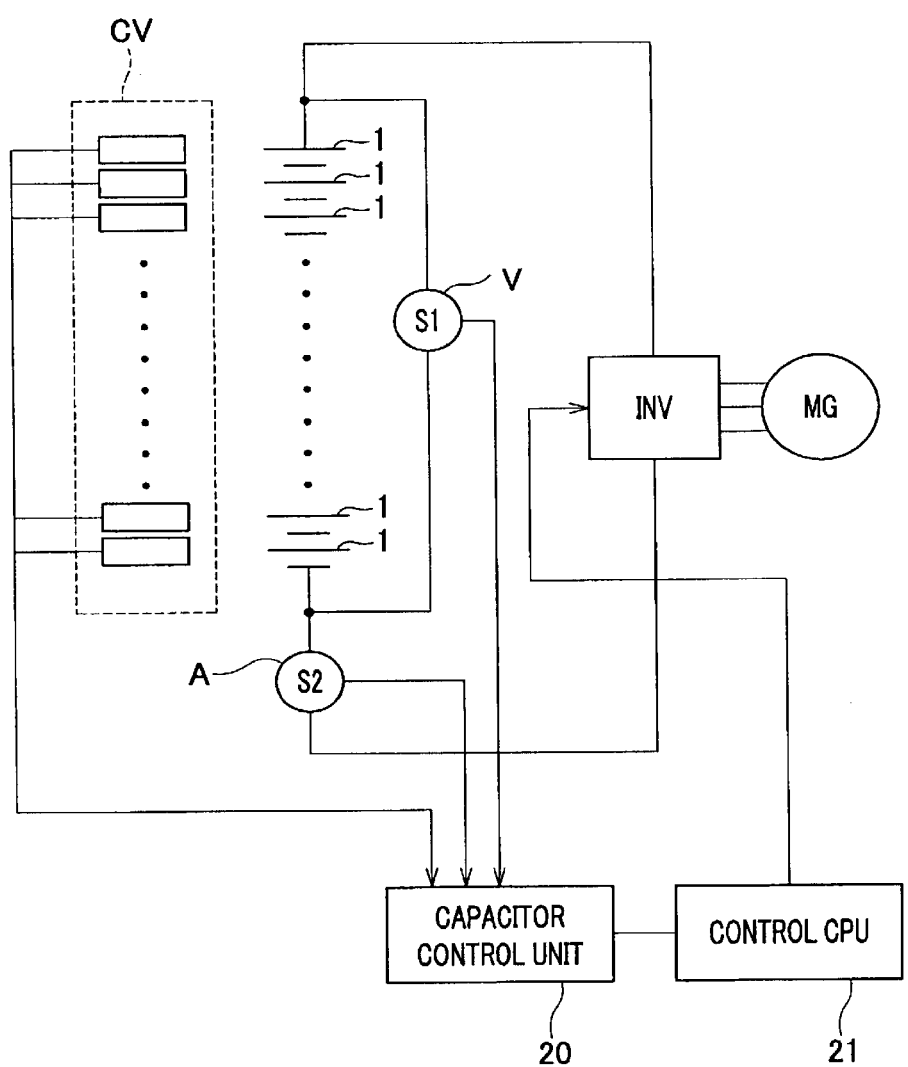
FIG. 3 is a circuit diagram showing an example of charge and discharge control circuit.

When a charge voltage is controlled by the control system shown in FIG. 3 so that the charge voltage does not exceed a (V), a predetermined voltage for an electrolytic solution is set to be a' (V), which is higher than the voltage of a (V) shown in FIGS. 5 and 6.

In case some failure occurs in the control system, the electric double-layer capacitor will not be overcharged at a higher charge voltage than the predetermined voltage of electrolytic solution. In this way, a failsafe control system can be achieved by both the control system with the predetermined voltage a (V) and the electrolytic solution according to the present invention with the other predetermined voltage a' (V).

It is not limited to the exemplary embodiment, by which the description has been made for the present invention.

Though the description has been made for an electric double-layer capacitor, in which a film-like rolled electrode is housed in a casing with a base, the present invention can be applied to a button type electric double-layer capacitor having a pair of electrodes interposing a separator.

Though an example which employs an activated carbon produced from mesophase pitch with alkali activation for an electrode has been described, the present invention can be applied to an electric double-layer capacitor having an electrode made of activated carbon of normal type.

Further, though an electrolytic solution of organic solvent has been exemplarily described, the advantages of the present invention hold true of an aqueous electrolytic solution.

What is claimed is:

1. A method for preparing an electrolytic solution of an electric double-layer capacitor which undergoes cyclical charging and discharging within a predetermined operating range of voltage, said capacitor comprising:
said electrolytic solution;
electrodes; and
a casing for housing said electrolytic solution and electrodes,
said method comprising the step of preparing an ion concentration of said electrolytic solution so that said electrolytic solution turns to a nonconductor at a first predetermined voltage, which is so set as to be equal to or greater than an upper limit of said predetermined operating range of voltage and less than or equal to a maximum allowable voltage of said capacitor.

2. A method according to claim 1, wherein said capacitor is employed while electrically connected to a charge and discharge control circuit having a second predetermined voltage thereof, and said first predetermined voltage is so set as to be equal to or greater than said second predetermined voltage and less than or equal to said maximum allowable voltage.

3. A method according to claim 1, wherein said ion concentration is set based on a function of charge voltage vs. coefficient of expansion of said electrodes or the other function of charge voltage vs. generated load thereof.

4. A method according to claim 1, wherein said electrodes are made of activated carbon which is produced from graphitized carbon with carbonization and subsequent alkali activation.

5. An electrolytic solution for an electric double-layer capacitor, which undergoes cyclical charging and discharging within a predetermined operating range of voltage, said capacitor comprising:
said electrolytic solution;
electrodes; and
a casing for housing said electrolytic solution and electrodes,
wherein said electrolytic solution is prepared with a method comprising the step of preparing an ion concentration of said electrolytic solution so that said electrolytic solution turns to a nonconductor at a first predetermined voltage, which is so set as to be equal to or greater than an upper limit of said predetermined operating range of voltage and less than or equal to a maximum allowable voltage of said capacitor.

6. An electric solution according to claim 5, wherein said capacitor is employed while electrically connected to a charge and discharge control circuit having a second predetermined voltage thereof, and said solution is prepared such that said first predetermined voltage is equal to or greater than said second predetermined voltage and less than or equal to said maximum allowable voltage.

7. An electric solution according to claim 5, wherein said solution is prepared such that said ion concentration is set based on a function of charge voltage vs. coefficient of expansion of said electrodes or the other function of charge voltage vs. generated load thereof.

8. An electric solution according to claim 5, wherein said solution is prepared when said electrodes are made of activated carbon which is produced from a graphitized carbon with carbonization and subsequent alkali activation.

9. An electric double-layer capacitor which undergoes cyclical charging and discharging within a predetermined operating range of voltage, said capacitor comprising:

an electrolytic solution;

electrodes; and a casing for housing said electrolytic solution and electrodes, wherein said electrolytic solution is prepared by a method comprising the step of preparing an ion concentration of said electrolytic solution so that said electrolytic solution turns to a nonconductor at a first predetermined voltage, which is so set as to be equal to or greater than an upper limit of said predetermined operating range of voltage and less than or equal to a maximum allowable voltage of said capacitor.

10. An electric double-layer capacitor according to claim 9, wherein said capacitor is employed while electrically connected to a charge and discharge control circuit having a second predetermined voltage thereof, and said solution is prepared such that said first predetermined voltage is equal to or greater than said second predetermined voltage and less than or equal to said maximum allowable voltage.

11. An electric double-layer capacitor according to claim 9, wherein said solution is prepared such that said ion concentration is set based on a function of charge voltage vs. coefficient of expansion of said electrodes or the other function of charge voltage vs. generated load thereof.

12. An electric double-layer capacitor according to claim 9, wherein said solution is prepared when said electrodes are made of activated carbon which is produced from a graphitized carbon with carbonization and subsequent alkali activation.

* * * * *